Oct. 9, 1934.  R. S. TROTT  1,975,910
ENGINE MOUNTING
Filed Nov. 30, 1931  3 Sheets-Sheet 1
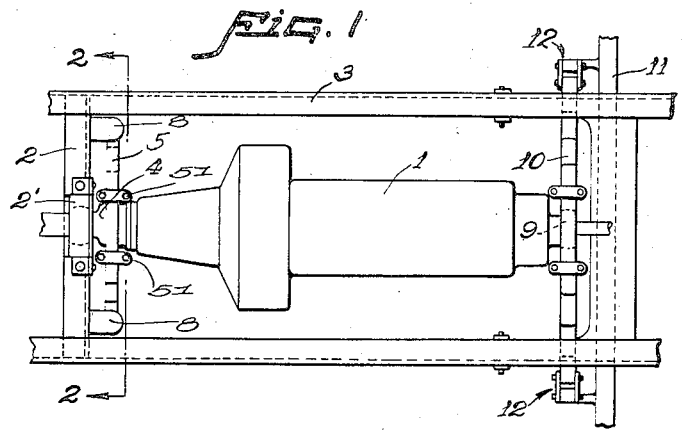
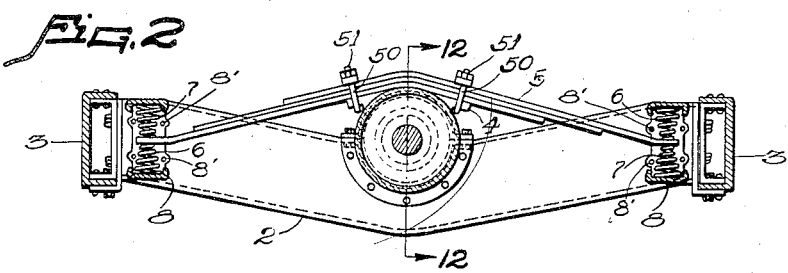
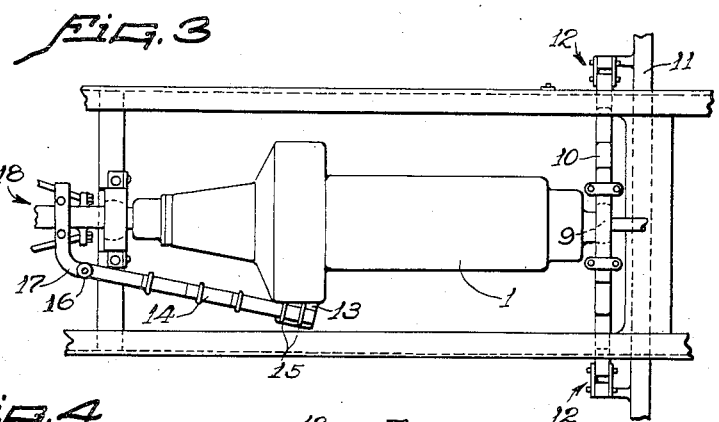
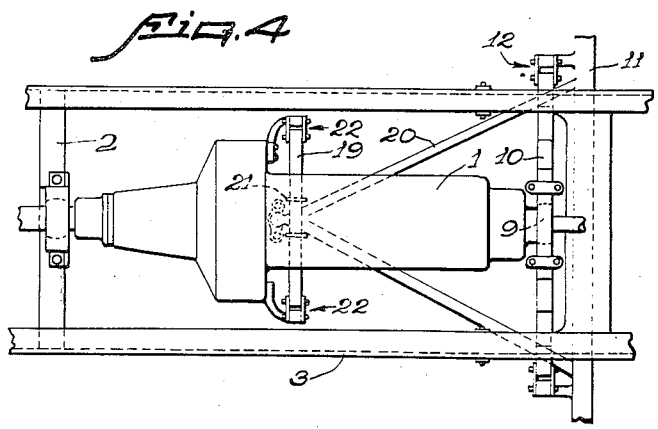
Inventor
Rolland S. Trott
Attorneys Oct. 9, 1934.        R. S. TROTT        1,975,910
ENGINE MOUNTING
Filed Nov. 30, 1931      3 Sheets-Sheet 2
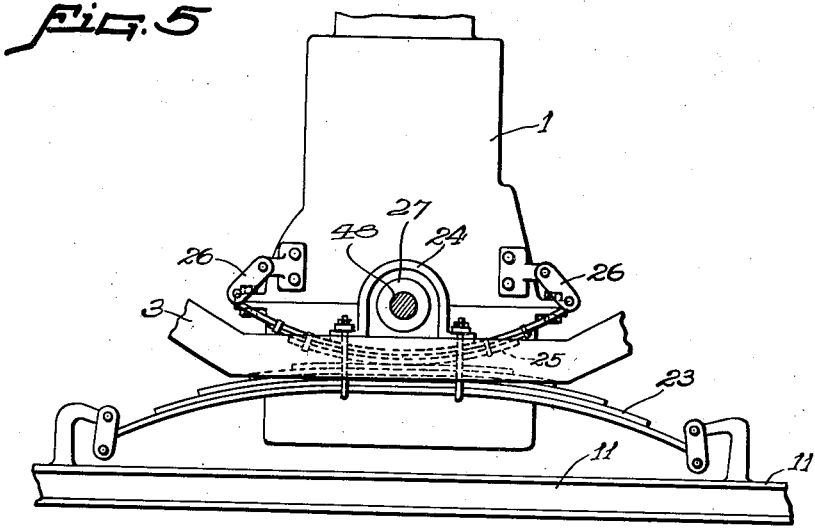
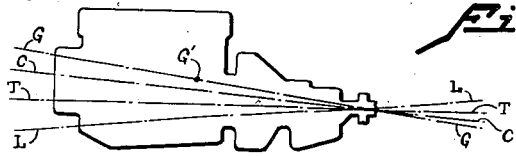
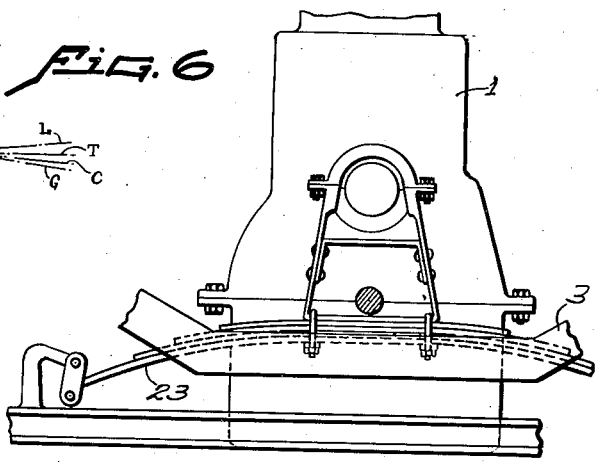
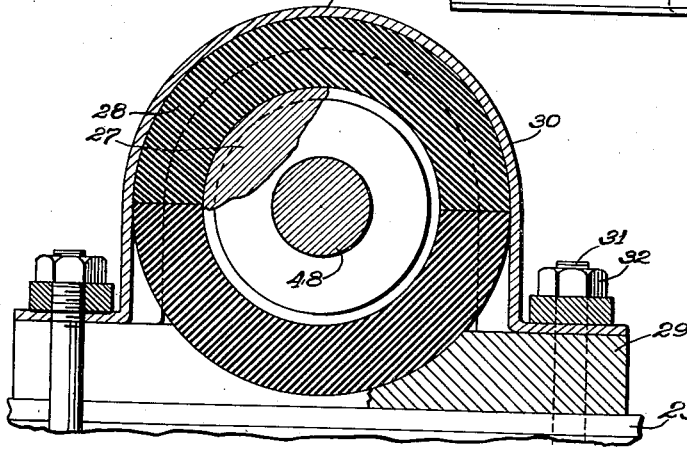
Inventor
Rolland S. Trott
Attorney Oct. 9, 1934.   R. S. TROTT   1,975,910
ENGINE MOUNTING
Filed Nov. 30, 1931   3 Sheets-Sheet 3
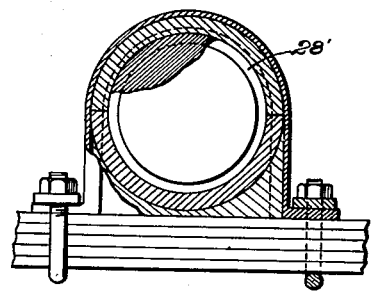
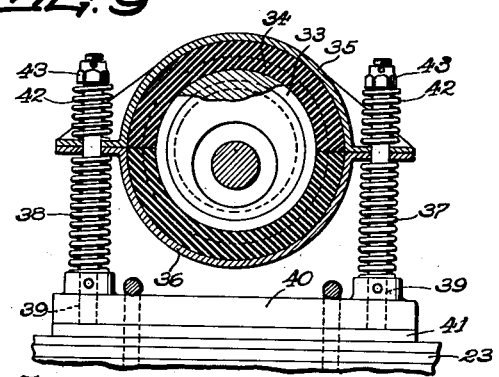
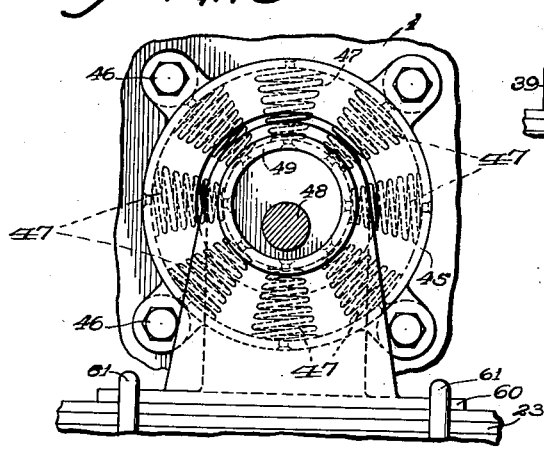
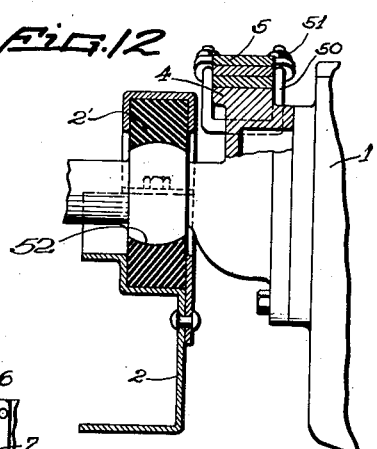
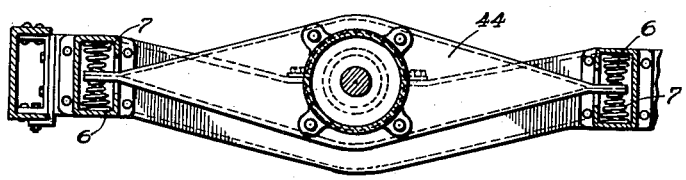

Patented Oct. 9, 1934

1,975,910

UNITED STATES PATENT OFFICE 1,975,910

ENGINE MOUNTING

Rolland S. Trott, Denver, Colo.

Application November 30, 1931, Serial No. 578,110

14 Claims. (Cl. 180—64)

My invention relates to engine unit or power plant mountings for automotive vehicles, and is an improvement over my former invention on engine mountings, application for patent on which was filed on November 24, 1928, Serial No. 321,634, now Patent No. 1,890,871, granted December 13, 1932.

In my former invention, the rear of the power plant was mounted pivotally upon the frame, and the front of the power plant was mounted upon a cross spring carried directly by the front axle, this front spring being so designed and constructed as to cause the movements of the power plant upon its front spring to harmonize as closely as possible with the movements of the vehicle frame upon its springs.

Where the weight of the power plant is large in proportion to its torque, the engine supporting spring must be strong enough to support the weight and perhaps will not be weak enough to properly cushion the torque. Where the torque of the power plant is high in proportion to its weight, the strength of the front engine spring to properly carry the engine torque may be greater than is required to carry its weight, making proper harmony of action between the front of the engine and the front of the frame difficult to obtain.

The object of this invention, therefore, is to provide an engine mounting having a torque resisting construction separated from the weight supporting construction so that the frame and engine weight supporting springs may be properly harmonized regardless of the torque to weight proportion of the power plant.

I accomplish this object by mounting the front of the power plant upon a front axle spring by means of a pivotal mounting and by mounting the rear of the power plant upon the frame, by a mounting which will accommodate for all engine unit movements provided by the front mounting thereof, while acting to position the engine longitudinally, and by providing stabilizing means between the engine unit and some part of the vehicle.

All of the above is fully explained and is illustrated in the drawings in which:

Figure 1 is a plan view of a portion of a motor vehicle, the torque connection being to the frame.

Figure 2 is a section taken on the line 2—2 of Figure 1.

Figure 3 is a plan view of a modified form showing the torque connection to the rear reach.

Figure 4 is a plan view of a modified form showing the torque connection to the front reach.

Figure 5 is a detail showing the torque connection to the front axle spring.

Figure 6 is a detail showing one form of mounting upon the engine spring.

Figure 7 is an enlarged detail showing one form of mounting.

Figure 8 is a detail showing a modified form of mounting on the engine spring.

Figure 9 is a detail of a modified form of front mounting on the engine spring.

Figure 10 is a detail showing a modified form of front mounting on the engine spring.

Figure 11 is a detail showing a torque connection to the frame, which can be substituted for the one shown in Figure 2.

Figure 12 is a vertical section through the form of rear mounting shown in Figure 1.

Figure 13 is a diagrammatic view of a unit power plant such as shown in Figure 1.

Now referring to Figures 1, 2, and 12, the power plant 1 at its rear end is pivotally mounted by the mounting 2' upon a cross member 2 of the frame 3. The mounting 2' has a seat 4 to which is secured a torque spring 5 by the clips 50 and nuts 51, the spring 5 extending to opposite sides of the mounting. The outer ends of the spring 5 are interposed between the springs 6 and 7 mounted in the housings 8 which are secured to the cross member 2, by the rivets 8' or in any other proper manner.

It will be seen that any torque cushioning oscillation of the power plant 1 upon its pivotal mounting 2' will be limited by the springs 6 and 7, and 5, but limited lateral movements of the front end of the power plant 1 will be accommodated for by fore and after movements of the ends of the spring 5, and by the mounting 2'.

At the front of the power plant 1 is a pivotal mounting 9 which is supported on a cross spring 10 fastened to the front axle 11 through the shackles 12. Sections of the mounting material in the pivotal mountings 2' and 9 are spherical in shape to provide substantially universal movement. See Figures 7, 8, 9, and 12.

The height of the mounting 9 may be high enough to provide with the mounting 2', an axis of oscillation G—G which passes through the center of gravity G' of the power plant. See Figures 6 and 13.

The front mounting 9 is located laterally to properly balance the engine unit. Lower positions of the mounting 9 may be used such as indicated by the axes C—C and T—T in Figure 1

13, so long as the desired all around results may thereby be obtained; in fact, the mounting 9 may even be lower, indicated by the axis L—L in some cases, and may be even spaced from the central vertical plane of the power plant, if for any reason, an unbalanced condition is desired.

Figure 3 shows another method of limiting the torque cushioning oscillation of the power plant 1. Fastened to one side and towards the rear of the power plant 1 is a spring mounting 13 to which is secured a torque spring 14 by the nutted clips 15. The rear of the spring 14 is fastened as at 16 to the bracket 17 which is carried by the rear reach member 18. It will be seen that torque cushioning oscillation of the engine unit 1 will be resiliently opposed by this construction.

In Figure 4, still another form of torque spring construction is shown. The torque spring 19 is fastened to the front reach 20 by the nutted clips 21 and the outer ends of the torque spring 19 are fastened to the power plant 1 by the shackles 22. Torque cushioning oscillation therefore of the power plant 1, will be resiliently opposed and limited by this construction. In Figures 3 and 4, the construction of the front end mounting of the power plant 1 is similar to that in Figure 1.

Figure 5 shows a construction in which a torque spring is mounted at the front end of the power plant 1. Supported upon a cross spring 23, is a pivotal mounting 24, supporting the front end of the power plant 1; also supported upon the cross spring 23 is a spring 25, the outer ends of which are secured by shackles 26 to the power plant 1. The cross spring 23 thus allows a floating and pivoting of the front end of the power plant 1 with respect to the frame, and may be constructed solely for the weight it has to carry. The spring 25 will limit torque cushioning oscillation of the engine unit and may be constructed only with reference to the required torque transmission.

Describing now in detail the front pivotal mounting 24, (Figures 5 and 7), 27 is a forwardly projecting boss carried by the power plant 1, either integral therewith or attached thereto, and the front end of which has a spherical periphery. In Figures 5 and 7, 27 is concentric with the engine shaft 48, but this need not necessarily be the case.

Extending around the boss 27 and in contact with it is a non-metallic or elastic part 28, the inner surface of which is shaped to conform to the spherical shaped surface of 27. The part 28 is supported upon the springs 23 and 25, by a base 29 and is secured in place by a flanged cap 30, through which the clips 31 extend and are held by the nuts 32. Thus any shocks will be deadened by the non-metallic part 28, which is held in place longitudinally by the flanges of the cap 30 and by the spherical face of the part 27.

Figure 8 shows another front pivotal mounting in which the non-metallic part 28 is replaced by a metal part 28'. This mounting, therefore, will not have any cushioning effect but will be only pivotal, though by the use of proper metal for the part 28' or by the use of a part metallic and part non-metallic part 28' considerable sound deadening may be obtained. This construction is not concentric with the crankshaft 48.

In Figure 9, another form of cushioned pivotal mounting is shown: 33 is an extending boss carried by the power plant, and which may or may not be concentric with the shaft 48, and which has a spherically shaped periphery; the part 34 is a conforming non-metallic member encircling the boss 33 and clamped within the parts 35 and 36 which are mounted upon springs 37 and 38. The springs 37 and 38 are located by bolts 39 fastened to a plate 40 to which may be vulcanized a strip of elastic material 41 which will be interposed between the spring 23 and the plate 40, whether or not it is vulcanized to one or both of the parts. On the upper end of the bolts 39 are springs 42 arranged to absorb any rebound. The springs 42 are held in contact with the flanged cap 35 by nuts 43 by which the desired compression on the springs 42 may be obtained.

Figure 10 is a view of a modified form of front mounting. The housing 45 is attached to the engine unit 1 by the screws 46 and contains a plurality of radial, conical coiled springs 47 whose inner ends are located on the sleeve 49 which is carried on the pedestal 60. The pedestal 60 is attached to the spring 23 by the clips 61. By the proper design, construction, strength and spacing of the various springs 47, the power plant may be given the proper range of float in any direction with respect to the spring 23.

Figure 11 is a view similar to Figure 2 but in which the transverse torque member 44 is not a leaf spring but whose ends are diametrically opposite. The springs 6 and 7 alone are in this construction relied upon for resilience in the absorption of torque reaction. The construction may be applicable in some special cases.

Figure 12 is a detail of the form of rear mounting shown in Figure 1 showing the outer spherical face of the part 52 which attaches to the engine unit whereby longitudinal movement of the engine unit 1 is prevented, and also showing the torque spring 5, clip 50 and nuts 51.

Figure 13 shows the axis of oscillation G—G which passes through the center of gravity G' of the engine unit, as well as showing the compromise axis C—C, the torque axis T—T and a still lower axis of oscillation L—L. This illustrates the change in the axis of oscillation that may be obtained by change of the height of the front pivotal mounting.

It will be seen that whether the torque cushioning pivotal movement of the engine unit 1 is resiliently opposed by torque means between the engine unit and the frame, between the engine unit and the front or rear reach, or between the engine unit and the front spring or between the engine unit and any other part of the vehicle, the rear of the engine unit, in any case, is movably mounted upon the frame of the vehicle so as to provide substantially universal pivotal movement and the front of the engine unit is pivotally mounted upon the front engine spring which is carried by the front axle. Thus the front engine spring may be designed solely with respect to the weight it has to carry and the torque stabilizing connection may be designed solely with the view to the torque it has to transmit.

It will also be seen that my rear unit composed of a frame cross member, rear mounting and torque construction may be combined with a front axle spring and various means mounting the front of the engine unit upon said spring; also the pivotal mounting of the front of the engine unit may be combined with various torque constructions whereby the torque may be transmitted from the engine unit to some part of the vehicle; or any of these elements may be combined with any other of these elements desired so long as the final result is an engine unit mounted to have force cushioning and resiliently opposed torque cushioning movements with respect to the frame and with one pivotal mounting on the frame and one pivotal mounting on a spring carried by the front axle.

Having now described my invention what I claim as new and desire to protect by Letters Patent is as follows:

1. In a motor vehicle having a frame and at least a front axle, the combination of an engine unit movably mounted at the rear upon the frame of the vehicle, resilient means carried by the front axle of the vehicle, means movably mounting the front of the engine unit upon said resilient means, and resilient stabilizing means between the engine unit and a part of the vehicle.

2. The combination in a motor vehicle having a frame and at least a front axle, of an engine unit, means mounting the rear of the engine unit movably upon the frame of the vehicle, spring means carried by the front axle, means movably mounting the front of the engine unit upon said spring means, and transverse stabilizer means adjacent the rear mounting between the engine unit and the frame.

3. In a motor vehicle having a frame and at least a front axle, the combination of an engine unit, a rear mounting carried by the frame of the vehicle, and movably supporting the rear of the engine unit, resilient means carried by the front axle of the vehicle, resilient means movably mounting the front of the engine unit upon said first-mentioned resilient means, and a stabilizer connection between the engine unit and a part of the vehicle.

4. In a motor vehicle, the combination with a frame, and at least a front axle, of an engine unit, a mounting for each of the front and rear ends of the engine unit and carrying the engine unit, said mountings being constructed and arranged for oscillatory movement of the engine unit therein, means carried by the frame for supporting the rear mounting, and resilient means carried by the front axle and carrying the front mounting, said front mounting being so constructed and arranged as to permit bodily movement of the engine unit relative to the last-mentioned resilient means.

5. In a motor vehicle, the combination with a frame and at least a front axle, of an engine unit, a mounting for each of the front and rear ends of the engine unit, and carrying said engine unit, said mountings being constructed and arranged for oscillatory movement of the engine unit therein, means carried by the frame for supporting the rear mounting, a resilient support carried by the front axle and carrying the front mounting, the engine unit having approximately universal movement in the rear mounting to accommodate for greater angular movement at the front mounting, and stabilizing means connected with the engine unit.

6. In a motor vehicle, the combination with a frame and at least a front axle, of an engine unit, a mounting for each of the front and rear ends of the engine unit, and carrying said engine unit, said mountings being constructed and arranged for oscillatory movement of the engine unit therein, at least one of said mountings being resilient, the rear mounting being constructed for universal movement of the engine unit therein to accommodate for greater angular movement at the front mounting, supporting means for the rear mounting and carried by the frame, a resilient support carried by the front axle and carrying the front mounting, and resilient stabilizing means connected with the engine unit.

7. In a motor vehicle, the combination with an engine unit having inherent torque cushioning oscillation about a longitudinal axis, means mounting an end portion of the engine unit on the vehicle and permitting approximately universal movement of said engine unit while holding said end portion against substantial lateral movement, resilient means mounting and supporting another portion of the engine unit spaced longitudinally from said first-mentioned portion on the vehicle and permitting restrained freedom of movement of the engine unit in any direction in response to the impulses incident to the operation of the engine unit and having a free pivotal connection with the engine unit, and a connection between the engine unit and the vehicle for stabilizing said engine unit therein.

8. In a motor vehicle having a chassis including wheel and axle means, the combination with an engine unit, of mountings for the front and rear end portions of the engine unit and carrying said engine unit, means carried by the chassis for supporting the rear mounting, and resilient means carried by the wheel and axle means and supporting the front mounting, said front mounting being so constructed and arranged as to permit oscillatory movement of the engine unit relative to the resilient supporting means therefor.

9. In a motor vehicle, the combination of a frame, an engine unit, rear mounting means carried by the frame and having a single universal connection with the engine unit for supporting the rear portion of the engine unit, a front mounting having a single universal connection with the engine unit for supporting the front portion of the engine unit, and resilient means carried by the vehicle and carrying said front mounting.

10. In a motor vehicle, the combination of a frame, an engine unit, resilient non-metallic rear mounting means mounting the rear of the engine unit and carried by the frame and having a single universal connection with the engine unit, resilient non-metallic front mounting means having a single universal connection with the engine unit, said mountings supporting the opposite ends of the engine unit, and resilient means carried by the vehicle and carrying the front mounting.

11. In a motor vehicle having an engine unit, means mounting the engine unit in the vehicle for resiliently opposed transverse movement in any direction combined with resiliently opposed torque cushioning oscillation about a longitudinal axis, including at least two longitudinally spaced resilient mounting structures, one of said structures being resiliently carried by the vehicle and having substantially pivotal connection with the engine unit, the other of said structures having portions mainly adapted to resiliently support the weight of the engine and having portions of different radial extent from said weight supporting portions and mainly adapted to resiliently oppose said torque cushioning oscillation.

12. In a motor vehicle having at least a front axle and a frame provided with a cross frame member, the combination with an engine unit, of a rear mounting for the engine unit carried by the cross frame member, a stabilizer connection between said rear mounting and the cross frame member, spring means mounted on the front axle of the vehicle, and means movably mounting the front portion of the engine unit on said spring means.

13. In a motor vehicle having a chassis including wheel and axle means, the combination with an engine unit, of mountings for the front and rear end portions of the engine unit and carrying said engine unit, means carried by the chassis for supporting the rear mounting, and resilient means carried at laterally separated points by the wheel and axle means and supporting the front mounting, said front mounting being so constructed and arranged as to permit oscillatory movement of the engine unit relative to the resilient supporting means therefor.

14. In a motor vehicle having a chassis including wheel and axle means, the combination with an engine unit, of mountings for the front and rear end portions of the engine unit and carrying said engine unit, means carried by the chassis for supporting the rear mounting for approximately transverse pivotal movement of the engine unit relative to the chassis, resilient means carried by the wheel and axle means and supporting the front mounting, said front mounting being so constructed and arranged as to permit transverse pivotal movement of the engine unit relative to the resilient supporting means therefor, and means connected with the engine unit and with the chassis for stabilizing the engine unit therein.

ROLLAND S. TROTT.